June 24, 1930.   M. R. MEACHAM ET AL   1,767,301
TANK SAMPLER
Filed May 22, 1928    3 Sheets-Sheet 1

Inventors
MERLE R. MEACHAM & WILLIAM J. SEELAND
By their Attorney

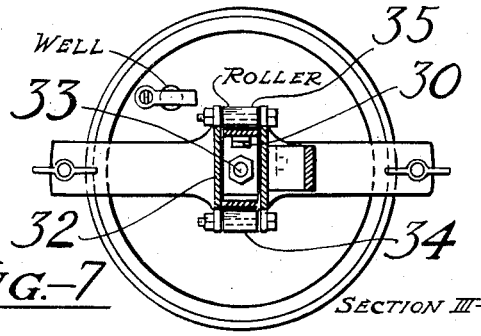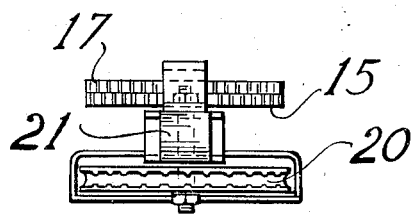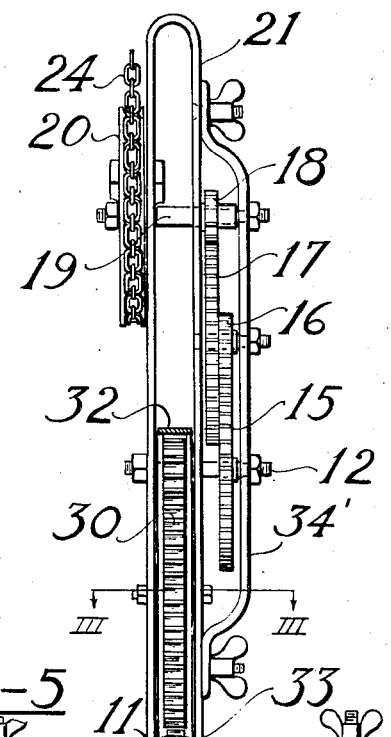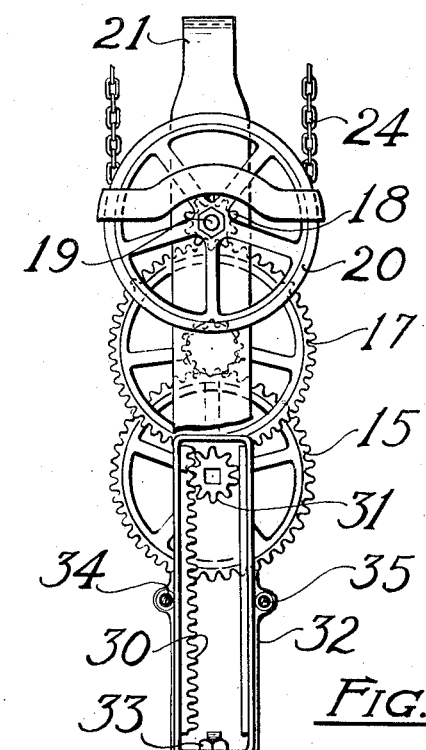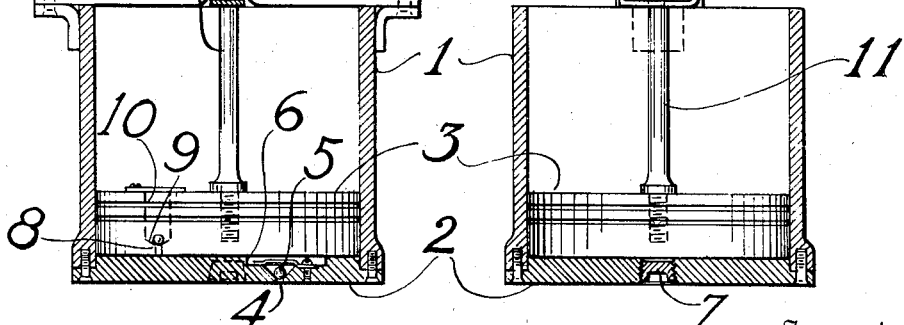

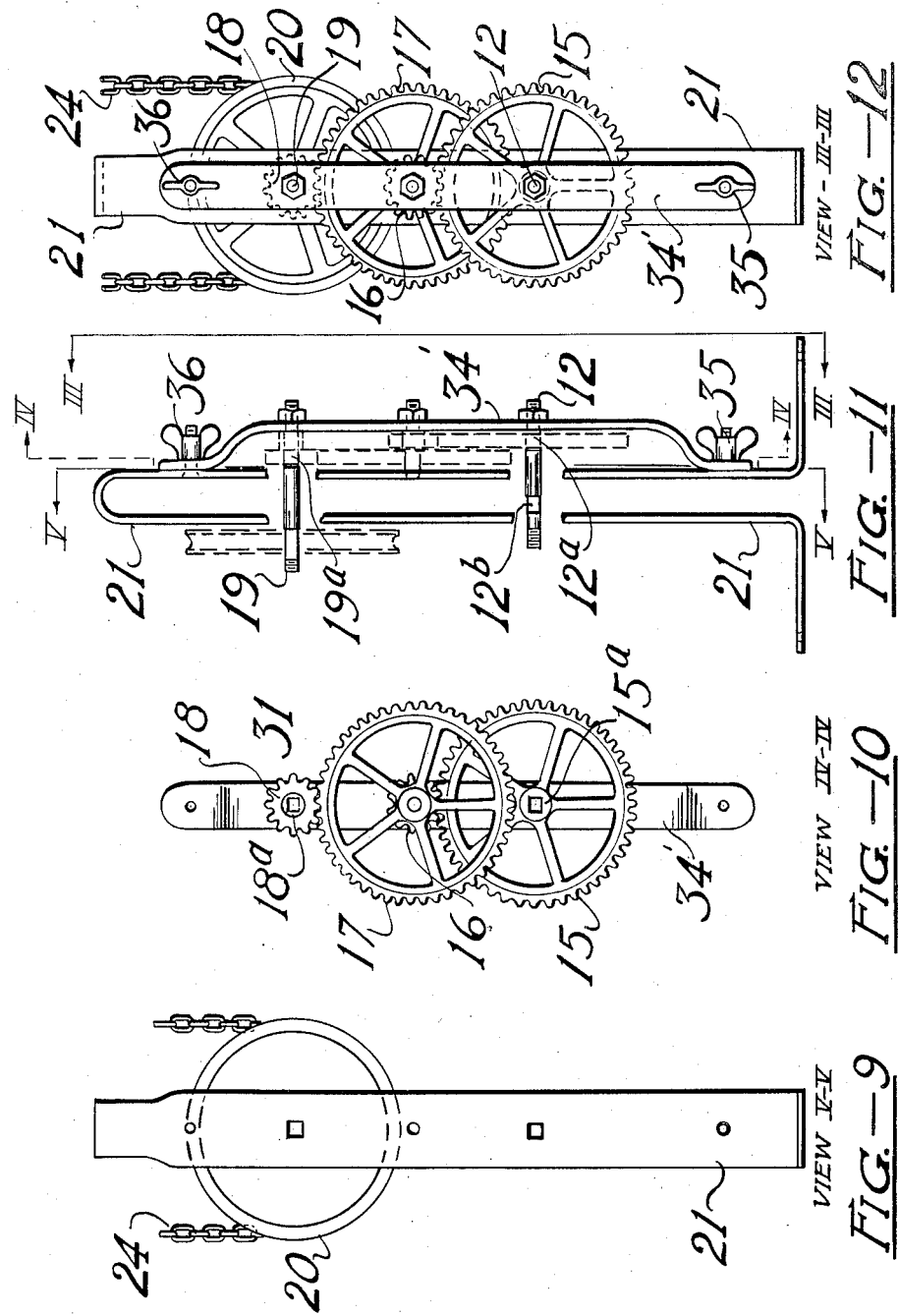

Patented June 24, 1930

1,767,301

UNITED STATES PATENT OFFICE

MERLE R. MEACHAM AND WILLIAM J. SEELAND, OF ELIZABETH, NEW JERSEY, ASSIGNORS TO STANDARD OIL DEVELOPMENT COMPANY, A CORPORATION OF DELAWARE

TANK SAMPLER

Application filed May 22, 1928. Serial No. 279,800.

This invention relates to samplers for liquids in tanks. Liquids stored in tanks, particularly of large size, are not usually of uniform composition throughout. This lack of uniformity may occur during storage as a result of changes in composition, causing the formation of a second liquid phase or may be due, for example, to the separation of water or emulsion from the liquid stored. Such tanks, moreover, may be partly filled on different occasions and the respective quantities introduced do not completely mix but remain to some extent in strata according to relative specific gravity. It may be generally stated, however, that the composition of the liquid stored is substantially homogeneous throughout any particular level but varies either continuously or discontinuously throughout its altitude. As a result of the foregoing, it is difficult to obtain a sample accurately representative of the composition of the liquid. This is further complicated by the fact that in tanks which are not vertically sided, both composition and volume vary as a function of altitude and spot samples do not combine to give a representative synthesis of the body of liquid sampled.

Our invention comprehends a device by which an accurately representative sample of a contained body of liquid may be taken regardless of variations in composition or in geometric form of the container.

Figures 5, 6, 7 and 8 are views of an alternative form of our device, corresponding respectively to Figures 1, 2, 3 and 4.

Figures 9, 10, 11 and 12 represent parts of either of the alternative forms shown in the preceding figures.

Our device comprehends generally a receptacle of variable capacity, an inlet therein, means for moving the receptacle through the liquid to be sampled and means for varying the capacity of the receptacle to maintain a predetermined relationship between the capacity thereof and its position with respect to the body of liquid to be sampled.

The device is preferably moved vertically and the capacity varied so that the increase in volume of the sampler bears a fixed and constant relationship to the volume of the horizontal strata through which the sampler is moved. Thus, if the sampler is started at the top or bottom of the liquid, the sampler volume at any selected position bears a constant ratio to the volume of the liquid in the tank between the horizontal planes through the starting position and selected position respectively; correspondingly, in passing through any increment of vertical travel through the liquid, the increase in volume of the receptacle bears this same constant relationship to the volume of the liquid sampled between the horizontal planes through the beginning and end of said increment.

With vertically sided tanks, the increase in volume of the variable receptacle bears a constant relationship to the distance travelled but with other than vertically sided tanks, to maintain the constant relationship hereinabove mentioned, the variation in capacity of the sampler must be at a rate which is a function of the altitude of the sampler and which can only be algebraically expressed.

Figure 3:
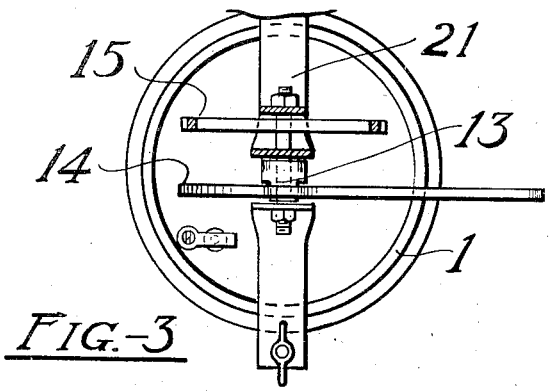
Figure 3 is a cross section and plan view of Figure 2 below the line II—II.
Figure 4:
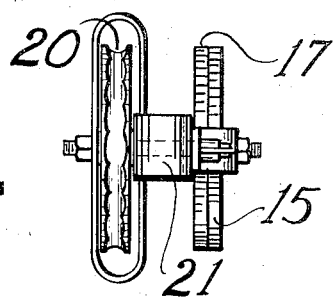
Figure 4 is a top view of Figure 2 above the line II—II.
Figures 1, 2:
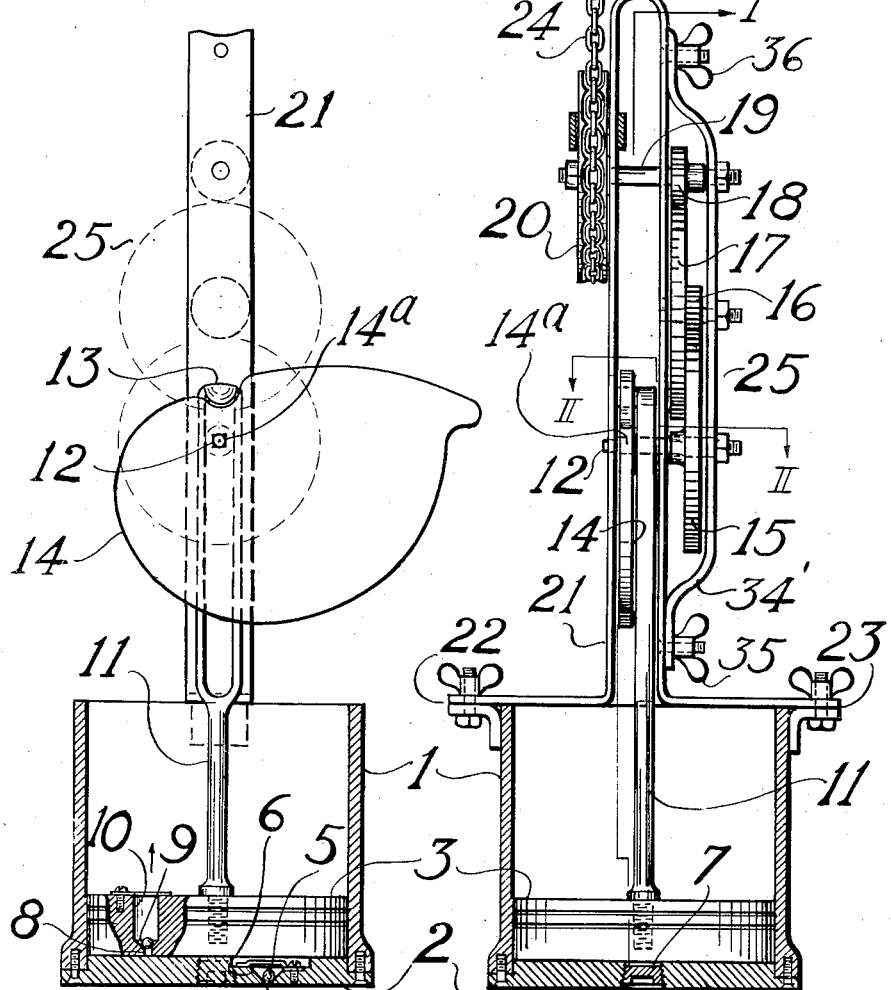
Figure 1 is a vertical section through a preferred embodiment of our invention.
Figure 2 is a vertical section taken at a right angle to Figure 1.

Referring specifically to Figures 1 and 2 in the preferred practical embodiment of our invention, the receptacle of variable capacity is constituted by the piston cylinder 1, the end closure 2 and the piston 3. The receptacle is provided with the inlet 4 preferably provided with a check valve consisting of the check 5 in the conical seat 6. A plug 7 is preferably provided through which the contents may be withdrawn when desired. An outlet 8 may be provided which should be equipped with a check 9, seating in the conical recess 10, to permit the expulsion of liquids or gases as the piston is advanced toward the closure end. The piston is rigidly connected to the piston rod 11, which rod is bifurcated so that it will span and be guided by the shaft 12. The piston is adapted to be reciprocated in the cylinder 1 by means of the rider 13 carried by the rod 11 and the cam 14 cooperating therewith. The cam is carried and revolved by the shaft 12, which in turn is actuated by the gear train 25, consisting of the meshed spur gears 15, 16, 17 and 18. Gear 18 is rotated by shaft 19, which in turn is rigidly connected to pulley 20. The cam, gears and pulley are supported by the bracket 21 rigidly secured to the piston cylinder 1 at 22 and 23 respectively. The pulley is provided with an annular groove, notches, spurs or other equivalent means whereby it is adapted to track in the loop of a flexible suspension means 24, such as a rope or chain. In operation, the sampler is moved vertically through the liquid to be sampled by the flexible suspension means 24, shown in part only. One end of this is made fast to the upper part of the tank and a depending loop or U bend is formed in which the pulley tracks. The operator manipulates the sampler by paying out or in the free part of the rope or chain 24, thereby causing the sampler to move vertically as the altitude of the base of the loop is varied while simultaneously rotating the pulley 20 and causing the piston 3 to move in a fixed relationship to the position of the sampler by means of the cam and gears hereinabove described.

The alternative device shown in Figures 5, 6, 7 and 8, is similar to the above in all corresponding parts and these are indicated by identical numerals. The rider 13 and cam 14 are, however, replaced by the rack 30 and pinion 31. The pinion is carried by shaft 12 and the rack by the rectangular frame 32, secured to the piston rod 11 by the nut 33. Rollers 34 and 35, respectively, guide the frame 32 and prevent lateral motion. The form shown in Figures 5 to 9, inclusive, is more simply constructed than that shown Figures 1 to 4 and is equally well adapted to tanks with vertical sides. The form shown in Figures 1 to 4 inclusive may be used in tanks with vertical sides and, in addition, in tanks of any geometric form.

When either of the devices are used in tanks with vertical sides, the piston travel is a first degree function of the distance travelled by the sampler and a representative sample will be obtained regardless of the reduction ratio of the gear train. To fill completely the sampler, the gear train should be so designed that the piston reaches the upper limit of stroke at the end of travel of the sampler through the liquid to be sampled. If the piston reaches the upper end of its stroke before the sampler reaches the upper limit of travel through the liquid, it will be necessary to start again at the point at which the sampler was completely filled.

For convenience in sampling similar tanks containing different levels of liquid, the gear ratio should be so designed that the piston reaches the upper limit of its stroke when the sampler is at or near the top of the tank, assuming that the sampler was started at the bottom, or conversely, if the sampler were started at the top. When the cam operated device is used in tanks not vertically sided, the came must be designed in reference to the geometric form of the tank and should move through a predetermined angle in vertically traversing the tank diameter. The gear train should accordingly be designed to accomplish this purpose.

To accommodate the sampler to the conditions described, we provide duplicate gear trains so that alternative trains may be conveniently substituted. See Figures 9 to 12 inclusive. Thus the pulley shaft 19 and the cam shaft 12 terminate in shanks $19^a$ and $12^a$, of angular cross section. The gears 18 and 15 which cooperate therewith, are provided with hubs of corresponding cross section, $18^a$ and $15^a$, adapted to fit over the said shanks. The gears 15, 16, 17 and 18 are, moreover, carried by the frame 34', which may be readily attached to or removed from the bracket 21 by manipulating the wing nuts 35 and 36. Further details of this construction appear in Figure 11 and the assembly is shown in detailed vertical elevation in Figure 12. Different types of cams are required for containers of different geometric form and to further adapt the device to a diversity of uses, the cam 14 is provided with a hub of angular cross section $14^a$, adapted to be removably fitted to the angular shank $12^b$ on the shaft 12. This shaft is so constructed that it may be slipped out of the bracket 21 (first removing the gear train), whereby cams of different profile may be easily substituted.

While other methods of operation may be employed, our preferred method consists in starting the sampler at the bottom of the liquid to be sampled with the piston fully advanced toward the closure end and gradually drawing the sampler upward through the liquid by paying in the free part of the rope or chain 24.

When the cam 14 is designed for a vertically sided tank, the profile thereof corresponds to a simple Archimedean spiral, represented by the equation $$r = a\theta + C \quad (1)$$

in which
 $r$ = the radius of the cam
 $\theta$ = the angle of revolution
 $C$ = a constant, which is the radius at the starting point.

Assuming, by way of example, that the cam radius is 1/2″ at the starting point, 7/2″ at the end of the stroke and that the cam moves through an angle of 270°.

$$7/2'' = a\ 270° + 1/2'' \quad (2)$$

and $a = 1/90$ inches per degree of revolution.

As previously stated, where cams are designed for tanks which are not vertically sided, such as, for example, spherical tanks or cylindrical tanks lying horizontally, the gear train 25 should be so chosen that the cam revolves through a predetermined angle, say, for example, 270°, as the sampler traverses the total height (diameter) of the tank starting, preferably, at the bottom. The angle of revolution of the cam at any selected point in its altitude may be calculated from the equation $$\theta = \frac{(y)}{(h)} \times \text{(Total angular revolution of cam from beginning to end of stroke)} \quad (3)$$

in which $\theta$ = the angle of revolution of the cam
$y$ = the altitude of sampler
$h$ = total height (diameter) of the tank The cam profile may therefore be mapped out by calculating corresponding values of $r$ and $\theta$. Assuming, for example, that the sampler is started at the bottom of the liquid and moved upward to any particular height, the movement of the piston must be such that the volume of the sampler up to the particular height $y$ is directly proportional to the volume of the tank sampled up to that position; this volume will be referred to as the innage of the tank.

To obtain the maximum capacity of the sampler, this constant relationship should be as follows and must not be exceeded if the tank is to be sampled in one pass:

$$\begin{Bmatrix}\text{Volume sampler}\\\text{at any select-}\\\text{ed height}\end{Bmatrix} = \frac{\text{Maximum volume sampler}}{\text{Total volume tank to be sampled}} \times \begin{Bmatrix}\text{Volume tank to}\\\text{be sampled (in-}\\\text{nage) up to the}\\\text{selected height}\end{Bmatrix} \quad (4)$$

The volume of the sampler for any selected height can now be calculated, using a table showing the innage of the tank for various heights of liquid. The cam radius bears an easily calculable relationship to the volume of the sampler, thus $$\frac{\text{Radius} = \text{total stroke of piston}}{\text{Total volume sampler}} \times \begin{Bmatrix}\text{Volume of sam-}\\\text{pler at any se-}\\\text{lected height}\end{Bmatrix} + \begin{Bmatrix}\text{The radius of the}\\\text{cam at the}\\\text{starting point}\end{Bmatrix} \quad (5)$$

Substituting the volume of the sampler at any selected height calculated by Equation (4) into Equation (5), the radius of the cam is obtained. Equation (3) gives the corresponding angular revolution of the cam. It is easy now to map out the cam profile.

Where innage tables are not available, the cam radius and sampler volume may be found by resort to the integral calculus.

It will, of course, be understood that our invention is not to be limited by the specific practical embodiments thereof but only by the appended claims or their equivalents in which it is our intention to claim broadly all novelty inherent in our invention.

We claim:

1. A sampler for liquids in tanks comprising a receptacle of variable capacity, an inlet therein, means for moving the receptacle through the liquid to be sampled, and means adapted to operate while the receptacle is being so moved for varying the capacity of the receptacle in a predetermined relationship to the distance moved.

2. A sampler for liquids in containers comprising a variable receptacle, means for moving the receptacle vertically through the liquid to be sampled, and means adapted to operate while the receptacle is being so moved for varying the capacity of the receptacle in a predetermined relationship to the distance moved.

3. A sampler for liquids in containers comprising a receptacle of variable capacity, means for moving the receptacle vertically through the liquid to be sampled, and means for varying the capacity of the receptacle in a predetermined relationship to the distance moved such that for any increment of vertical travel, the increase in volume of the receptacle bears a constant relationship to the volume of the liquid sampled between the horizontal planes through the beginning and end respectively, of said increment of travel.

4. A sampler for liquids in tanks comprising a receptacle of variable capacity, means for moving the receptacle vertically through the liquid to be sampled and means for varying the capacity of the receptacle in a predetermined relationship to the distance moved comprising a pulley adapted to track in the depending U bend of a flexible suspension means, one side of which is secured and which pulley is adapted to rotate as the altitude of said bend is varied by manipulating the unsecured side of said suspension means.

5. A sampler for liquids in tanks comprising a receptacle of variable capacity, means for moving the receptacle vertically through the liquid to be sampled, and means comprising a cam for varying the capacity of the receptacle in a predetermined relationship to the distance moved.

6. A sampler for liquids in tanks comprising a receptacle of variable capacity, means for moving the receptacle vertically through the liquid to be sampled, and means for varying the capacity of the receptacle in a predetermined relationship to the distance moved, comprising a cam, the profile of which is so formed that the increase in volume of the receptacle during any increment of vertical travel bears a constant relationship to the volume of the liquid sampled, between the horizontal planes drawn through the beginning and end respectively of said increment of travel.

7. A sampler for liquids in tanks comprising a receptacle of variable capacity, means for moving the receptacle vertically through the liquid to be sampled, means for varying the capacity of said receptacle in a predetermined relationship to the distance moved comprising a cam, and means for effecting the revolution of said cam comprising a pulley adapted to track in a depending U bend of flexible suspension means, one side of which means is secured and which pulley is adapted to rotate as the altitude of said U bend is varied by manipulating the unsecured side.

8. Apparatus according to claim 7 in which the profile of said cam is so formed that the change in capacity of said receptacle during any increment of vertical movement bears a constant ratio to the volume of the liquid sampled between the horizontal planes drawn through the beginning and end respectively of said increment of travel.

9. A sampler for liquids in tanks comprising a piston cylinder, an end closure for said cylinder, a piston adapted to reciprocate in said piston cylinder to form a receptacle of variable capacity, an inlet to said receptacle, means for moving said receptacle through the liquid to be sampled, and means adapted to operate while the receptacle is being so moved for varying the capacity of said receptacle by reciprocating the said piston in a predetermined relationship to the distance moved by said sampler.

10. A sampler for liquids in containers comprising a piston cylinder, an end closure for said piston cylinder, a piston adapted to reciprocate in said piston cylinder to form a receptacle of variable capacity, an inlet to said receptacle, means for moving the said receptacle vertically through the liquid to be sampled, and means for reciprocating the said piston in a predetermined relationship to the distance travelled, comprising a gear train driven by a pulley which pulley is adapted to track in a depending U bend of flexible suspension means, one side of which suspension means is secured and which pulley is adapted to be rotated as the altitude of said U bend is varied by manipulating the unsecured side.

11. A sampler for liquids in containers comprising a piston cylinder, a closure at one end thereof, a piston adapted to reciprocate in said piston cylinder to form a receptacle of variable capacity, an inlet to said receptacle, means for moving said receptacle, means for moving said receptacle vertically through the liquid to be sampled, and means for varying the capacity of said receptacle comprising a cam, a gear train actuated by the revolution of a pulley, said pulley being adapted to track in a depending U bend of a flexible suspension, one side of which is secured, and which pulley is adapted to rotate as the altitude of said U bend is varied by manipulating the unsecured side of said loop.

12. Apparatus according to claim 10 in which the said gear train is made detachable so that gear trains of different ratios may be easily substituted whereby the said sampler may be adapted to different lengths of vertical travel.

13. Apparatus according to claim 11 in which said cam is made detachable so that cams of different profiles may be easily substituted whereby the said sampler may be conveniently adapted to containers of varying geometric forms.

MERLE R. MEACHAM.
WILLIAM J. SEELAND.